United States Patent [19]

Chorkey

[11] Patent Number: 4,821,774

[45] Date of Patent: Apr. 18, 1989

[54] SOLENOID OPERATED VALVE WITH BALANCING MEANS

[76] Inventor: William J. Chorkey, 34300 Lyncroft, Farmington, Mich. 48024

[21] Appl. No.: 176,870

[22] Filed: Apr. 4, 1988

[51] Int. Cl.⁴ .................. F16K 31/06; F15B 13/044
[52] U.S. Cl. ......................... 137/625.65; 137/625.26; 137/625.64; 251/129.07; 251/129.21
[58] Field of Search .................. 251/129.07, 129.21; 137/625.26, 625.63, 625.64, 625.65

[56] References Cited

U.S. PATENT DOCUMENTS 3,684,238  8/1972  Michellone et al. ........... 251/129.07
4,647,008  3/1987  Shirai et al. ..................... 251/129.07

Primary Examiner—Arnold Rosenthal
Attorney, Agent, or Firm—Gifford, Groh, Sheridan, Sprinkle and Dolgorukov

[57] ABSTRACT

A balanced solenoid operated valve having a balanced solenoid armature, with balancing means in the upper end of the armature, and the valve can be made as a two-way valve, a three-way valve or a four-way valve.

17 Claims, 7 Drawing Sheets

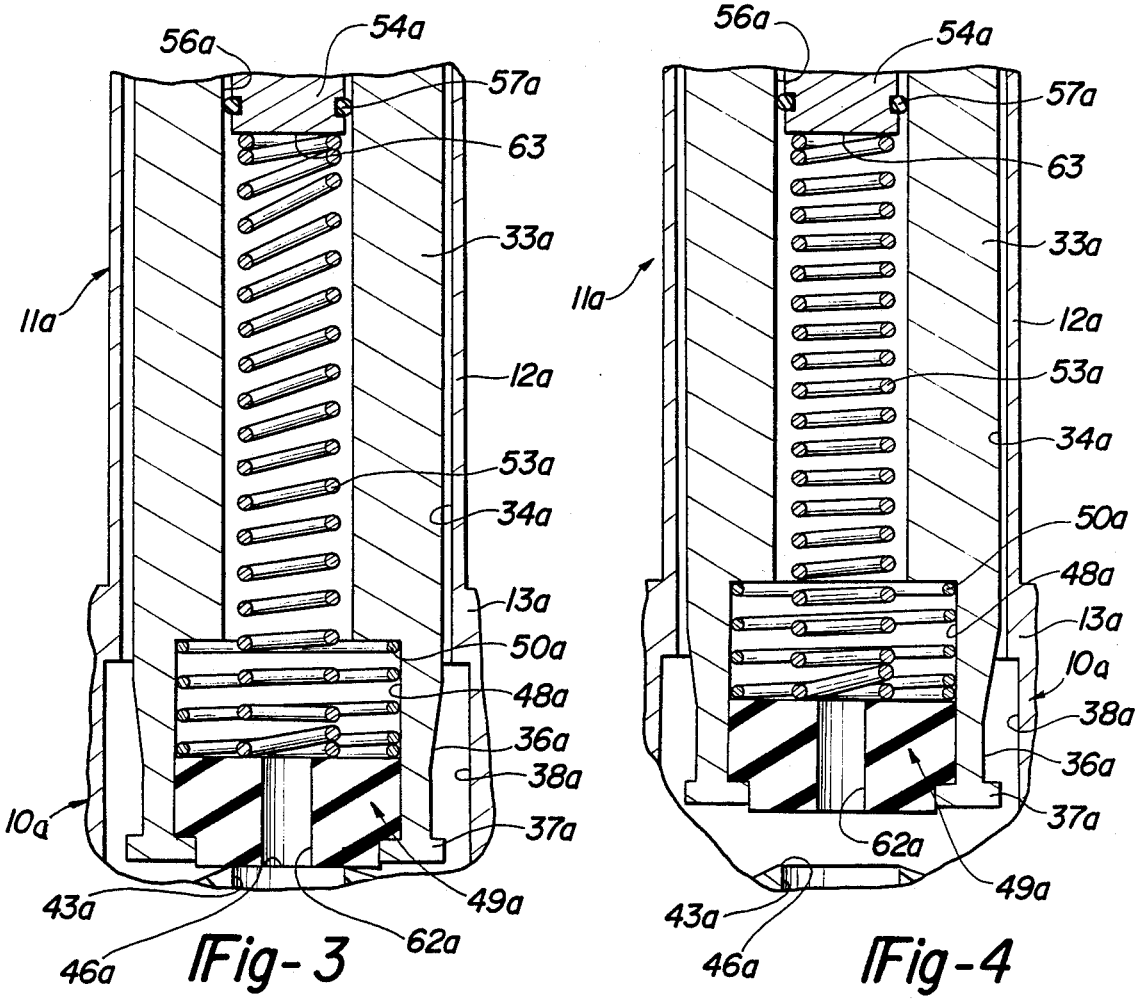
*Fig-3*   *Fig-4*
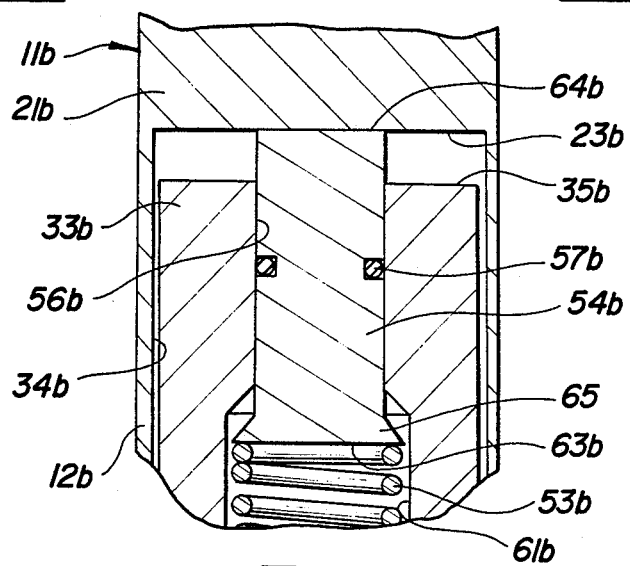
*Fig-5*

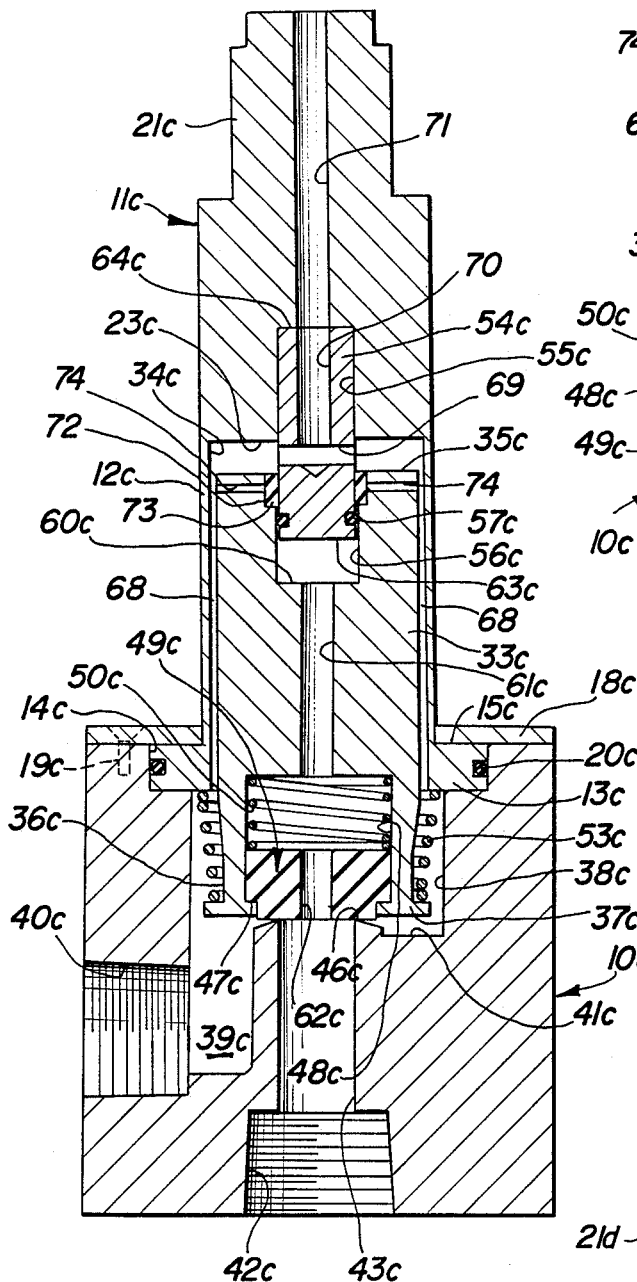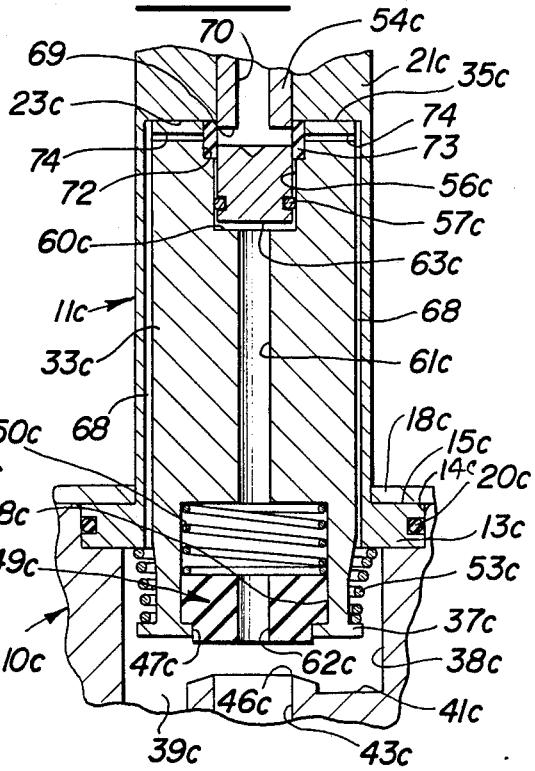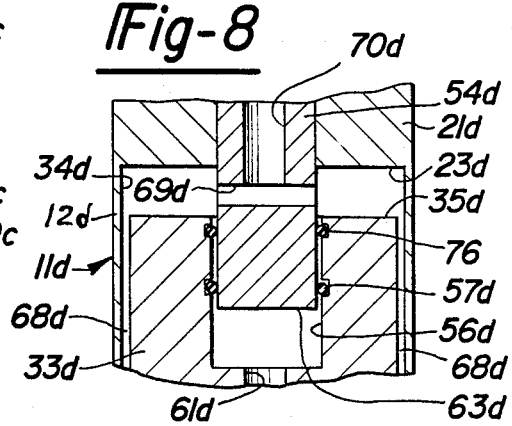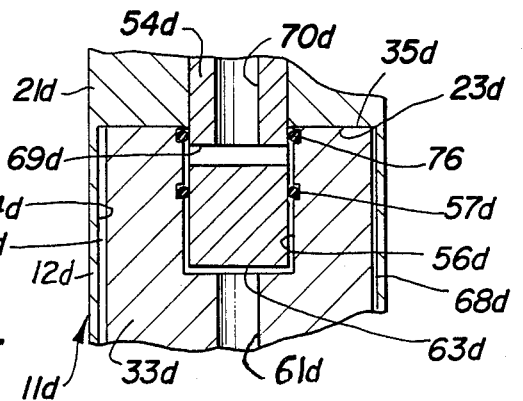

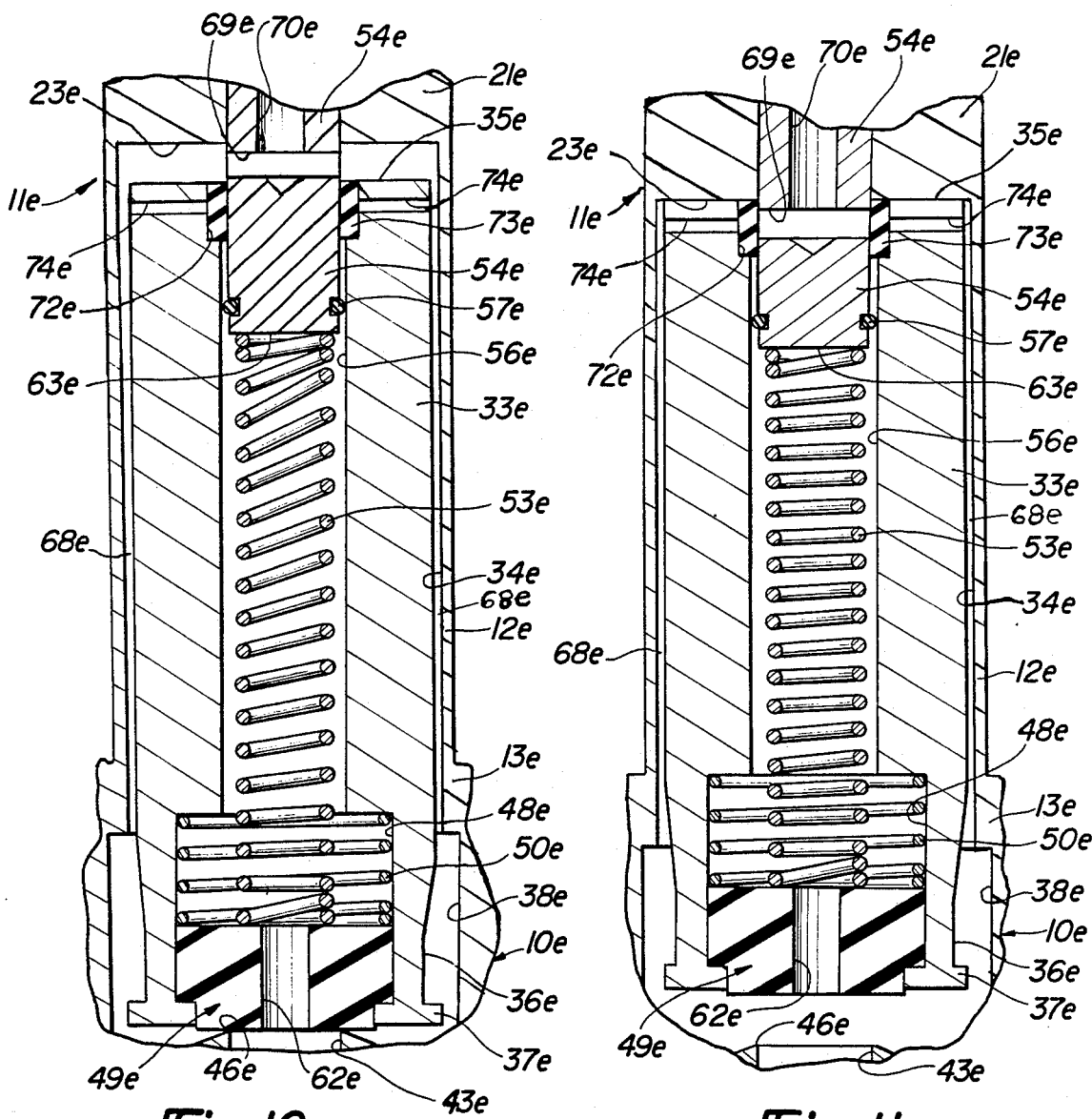

SOLENOID OPERATED VALVE WITH BALANCING MEANS

BACKGROUND OF THE INVENTION

1. Technical Field

The field of art to which this invention pertains may be generally located in the class of devices relating to valves. Class 137, Fluid Handling, U.S. Patent Office Classification, appears to be the applicable general area of art to which the subject matter similar to this invention has been classified in the past.

2. Background Information

It is known in the valve art to provide solenoid operated two-way, three-way and four-way poppet valves for controlling the flow of fluid, either air or hydraulic oil, to a device which is to be controlled by fluid under pressure, as for example, another valve or a fluid cylinder. A problem encountered in the use of solenoid operated poppet valves is that they require a large solenoid thrust when these valves are used to control high pressure fluids, in order to overcome the large spring pressure required to maintain the solenoid armature in a closed position against the pressure of the fluid. This problem has been partially solved by the balanced solenoid operated poppet valves disclosed in U.S. Pat. No. 4,598,736 which provides for the elimination of the need of a high solenoid thrust in a solenoid operated poppet valve, by the provision of a lower balancing means which balances the solenoid armature. However, the lower balanced type solenoid operated poppet valve disclosed in this patent has a disadvantage in that the lower balancing system employed in those types of solenoid operated poppet valves cannot be efficiently adapted for use in a two-way solenoid operated poppet valve.

SUMMARY OF THE INVENTION

In accordance with the present invention, upper balanced two-way, three-way and four-way solenoid operated poppet valves are provided which are small in structure. The solenoid operated poppet valves, with upper balancing means, made in accordance with the invention, may be used for separate two-way, three-way and four-way valve control functions, or they may be used as a pilot valve for controlling other valves, such as three-way or four-way valves.

The present invention overcomes the aforementioned problem of the need for a high solenoid thrust in a solenoid operated poppet valve when controlling high pressure fluids by providing a solenoid armature with an upper balancing means so as to balance the solenoid armature when it is in a de-energized or energized position. The unique structure of the solenoid operated poppet valve, with upper balancing means, provides a valve structure which can be made to a small size.

The valve includes an axial balancing hole in the upper end of the armature, and which has the upper end thereof open to an armature guide tube. The axial balancing hole is formed to a cross section area equal to the cross section area of an axial hole in the valve body. A sealed balancing plug is mounted in the axial balancing hole in the armature. A fluid passage is formed through the armature and poppet valve seal and interconnects the axial hole in the valve body with the axial balancing hole in the armature to convey pressurized fluid from the inlet port of the valve into the axial balancing hole in the upper end of the armature and into balancing engagement with the balancing plug to balance the armature when it is in a de-energized position.

BRIEF DESCRIPTION OF THE DRAWINGS

FIG. 3 is a fragmentary, elevation section view of a modified upper balanced solenoid armature for use in a two-way valve as disclosed in FIG. 1, and showing the modified armature in a de-energized position.

FIG. 4 is a fragmentary, elevation section view, same as FIG. 3, but showing the armature of FIG. 3 in an energized position.

FIG. 5 is a fragmentary, elevation section view of the upper portion of another modified upper balanced solenoid armature for a two-way valve, made in accordance with the present invention, and showing the modified armature in a de-energized position.

FIG. 6 is an elevation section view of a three-way solenoid operated poppet valve with upper balancing means, made in accordance with the present invention, and showing the valve in a de-energized position.

FIG. 7 is a fragmentary, elevation section view, with parts removed, similar to FIG. 6, of the three-way poppet valve illustratd in FIG. 6, and showing the three-way poppet valve in an energized position.

FIG. 8 is a fragmentary, elevation section view of the upper end structure of a modified armature for use in the three-way solenoid operated valve with upper balancing means illustrated in FIG. 6, and showing the armature in a de-energized position.

FIG. 9 is a fragmentary, elevation section view, similar to FIG. 8, of the modified armature structure illustrated in FIG. 8, and showing that armature structure in an energized position.

FIG. 10 is a fragmentary, elevation section view, of another modified upper balanced solenoid armature for use in a three-way valve as disclosed in FIG. 6, and showing the modified armature in a de-energizd position.

FIG. 11 is a fragmentary, elevation section view, the same as FIG. 10, but showing the modified armature of FIG. 10 in an energized position.

DESCRIPTION OF THE PREFERRED EMBODIMENTS

Figure 1:
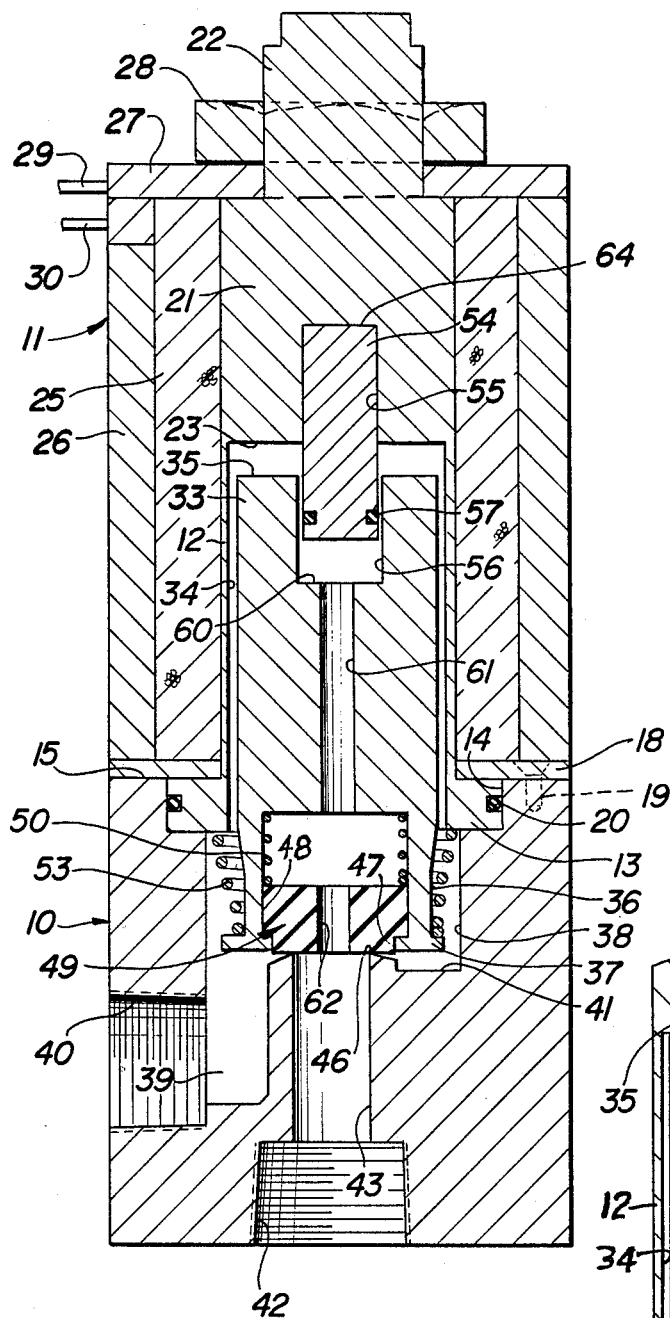
FIG. 1 is an elevation section view of a two-way solenoid operated poppet valve with upper balancing means, made in accordance with the present invention, and showing the valve in a de-energized position.

Referring now to the drawings, and in particular to FIG. 1, the numeral 10 generally designates a two-way valve body made in accordance with the invention. The numeral 11 generally designates a solenoid operatively mounted on the valve body 10. The solenoid 11 includes a cylindrical solenoid armature guide tube 12 which has a radially enlarged, integral lower end flange 13 that is seated in a recess 14, which is formed in the upper end 15 of the valve body 10. A clamp ring 18 is seated on the valve body end 15 and holds the armature guide tube 12 on the valve body 10. The clamp ring 18 is releasably secured to the valve body 10 by a plurality of suitable screws 19. An O-ring seal 20 is mounted in a groove formed around the armature guide tube lower end flange 13.

A cylindrical pole piece 21 has its lower end 23 integrally attached to the upper end of the armature guide tube 12 and it encloses the upper end of the armature guide tube 12. The upper end 22 of the pole piece 21 is externally threaded. The solenoid 11 includes a conventional solenoid coil 25 which is disposed around the solenoid armature cylindrical guide tube 12 and the pole piece 21. The lower end of the solenoid coil 25 is seated on the clamp ring 18. A conventional solenoid housing 26 surrounds the solenoid coil 25, with the lower end thereof being seated on the clamp ring 18. A flux ring 27 is mounted around the threaded upper end 22 of the pole pieces 21, and it is seated against the upper end of the solenoid coil and solenoid housing 25 and 26, respectively. A suitable lock nut 28 is threadably mounted on the threaded upper end 22 of the pole piece 21 and it functions to retain the solenoid coil 25 and solenoid housing 28 in place on the clamp ring 18. The numerals 29 and 30 in FIG. 1 designate the usual electrical power lead wires for the solenoid coil 25.

A solenoid armature or plunger 33 is slidably mounted within the cylindrical bore or chamber 34 in the armature guide tube 12. The distance at the upper end 35 of the armature 33 as spaced from the lower end 23 of the pole piece 21 is the stroke through which the armature 33 moves when the solenoid coil 25 is energized.

As shown in FIG. 1, the lower end of the armature 33 has a reduced diameter periphery 36, which terminates in an integral, enlarged diameter, peripheral flange 37. The lower end 36 and flange 37 of the armature 33 extend downwardly into an axial, cylindrical transfer recess or chamber 38, which is formed in the upper end with the recess 14. A threaded cylinder or transfer port 40 is formed in one side of the valve body 10 and it communicates at its inner end through a passage 39 with the transfer chamber 38. The transfer chamber 38 has a transverse inner end wall 41. A threaded inlet port 42 is formed in the bottom end of the valve body 10 and it communicates with the transfer chamber 38 through an axial bore or passage 43. A circular poppet valve seat 46 is formed at the inner end of the axial bore 43, at the point where said bore communicates with the transfer chamber 38.

As shown in FIG. 1, the lower end of the armature 33 has an inwardly extended axial bore 47 which communicates with an enlarged diameter bore 48. A poppet valve seat, generally indicated by the numeral 49, having a T-shaped vertical cross section body, as shown in FIG. 1, is seated in the armature bores 47 and 48, with the enlarged T-shaped head portion seated in the bore 48 and on the shoulder formed by the junction of the bores 47 and 48. A suitable coil spring 50 is mounted in the bore 48, and it functions as a poppet valve seal load spring. The load spring 50 is disposed with the lower end thereof in seating engagement against the inner side of the poppet valve seal 49, and the upper end in seating engagement against the upper end wall of the bore 48. The poppet valve seal 49 is made from any suitable material, as for example, an elastomeric material.

An armature return spring 53 is mounted around the lower end of the armature 33, with the upper end thereof seated against the lower end 13 of the armature guide tube 12 and the lower end thereof seated against the upper side of the armature flange 37. The armature return spring 53 functions to maintain the armature 33 in the position shown in FIG. 1, with the poppet valve seal 49 in seating engagement on the poppet valve seat 46 when the solenoid 11 is de-energized.

As shown in FIG. 1, a cylindrical balancing plug or piston 54 is fixedly mounted, by any suitable means, as by a press fit, in an axial bore 55 formed in the pole piece 21 and extended upwardly from the lower end 23 of the pole piece 21. The lower end of the balancing plug 54 extends downwardly into an axial bore 56 which is formed in the upper end of the armature 33 and which terminates at an inner end wall 60. A suitable O-ring seal 57 is operatively mounted in a groove formed around the periphery of the lower end of the balancing plug 54 and it sealingly engages the wall of the axial bore 56.

The axial bore 56 is made to the same diameter as the inlet passage bore 43. The bore 43 and 56 are connected through a bore 61 which is of a diameter smaller than the bore 56, a bore 62, and the bore 48. The bore 61 connects the lower end of the bore 56 in the armature 33 with the upper end of the bore 48. The bore 62 connects the bore 48 with the upper end of the bore 43. The bore 62 is formed through the poppet valve seal 49.

It will be seen that the last described combination of structural elements, including the balancing plug 54, the bores 43, 48, 61, 62 and 56 comprise an upper balancing means which functions in the following described manner. When the inlet port 42 is operatively connected to a source of fluid under pressure, the pressurized fluid passes upwardly through the bores 43, 62, 48 and 61 and thence into the bore 56 wherein it reacts against the balancing plug 54. The cross sectional area of the inlet passage 43 is the same as the cross sectional area of the bore 56, and accordingly, the pressure exerted on the bottom face of the poppet valve seal 49 tending to move it off of the poppet valve seat 46, is balanced by the pressure in the bore 56, which reaccts downwardly on the armature 33. The upward and downward fluid pressures thus exerted on the armature 33, when the valve of FIG. 1 is in the de-energized position shown in FIG. 1, are balanced and the armature return spring 53 may be of any strength which has a light thrust action, since it does not have to overcome the pressure of the inlet fluid in the bore 43 in order to hold the poppet seal 49 in a closed position on the poppet valve seat 46 when the solenoid 11 is in the de-energized position.

Figure 2:
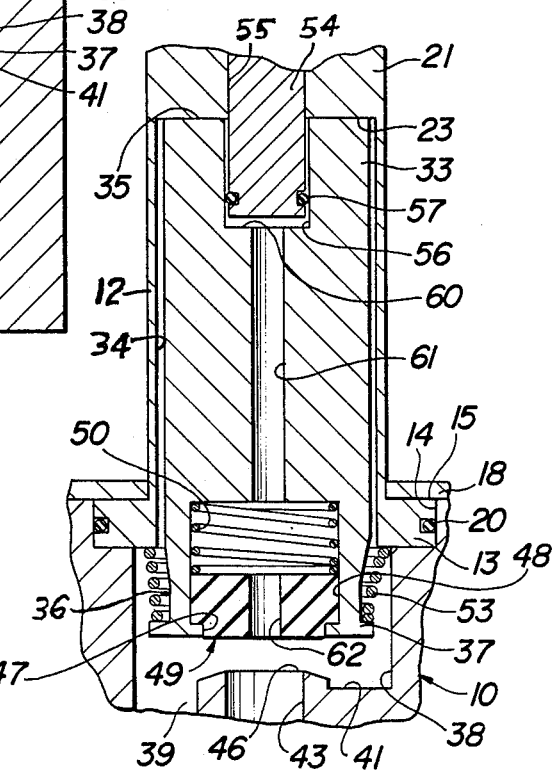
FIG. 2 is a fragmentary, elevation section view, with parts removed, similar to FIG. 1, of the two-way valve illustrated in FIG. 1, and showing the two-way valve in an energized position.

When the solenoid coil 25 is energized, the solenoid armature 33 is moved upwardly, so as to lift the poppet valve seal 49 off of the poppet valve seat 46, and move the armature 33 to the energized position, shown in FIG. 2. In the energized position shown in FIG. 2 the inlet fluid is permitted to pass from the transfer chamber 38 and out through the passage 39 to the cylinder or transfer port 40. When the armature 33 is in the raised or energized position shown in FIG. 2, the transfer chamber 38 is filled with inlet fluid under pressure. The fluid under pressure also passes up around the armature 33 and it gets in behind the upper end of the armature 33, and it also passes upward through the bores 62, 48 and 61, whereby the inlet pressure is on all sides of the armature 33, and it is in a balanced condition in the energized position shown in FIG. 2. It will be understood that the upper balancing means of the present invention is needed only in the de-energized position, although the armature 33 is also balanced as stated hereinabove, when it is in the energized position.

FIG. 3 is a fragmentary, elevation section view of a modified upper balanced solenoid armature for use in a two-way valve as disclosed in FIG. 1, and showing the modified armature in the de-energized position. The parts of the armature embodiment of FIG. 3 which are the same as the parts of the armature embodiment of FIGS. 1 and 2 have been marked with the same reference numerals followed by the small letter "a". In the modified armature 33a the bore 56a in the upper end of the armature 33a is extended downwardly to communicate with the poppet seal chamber 48a. The armature return spring 53a has been disposed inside of the bore 56a and has its upper end abutting the fixed balancing plug 54a and the lower end thereof engaging the upper side of the poppet valve seal 49a to move the armature 33a downwardly, and the poppet valve seal 49a into seating engagement on the valve seat 46a when the solenoid 11a is de-energized. The mounting of the armature return spring 53a inside of the bore 56a instead of mounting it on the exterior of the lower end of the armature 33a, as shown in FIG. 1, in the first embodiment provides a compact armature assembly. The modified armature embodiment of FIG. 3 permits the inlet pressurized air to enter through the inlet passage 43a and to pass through the bore 62a, and thence through the poppet valve seal chamber 48a and the bore 56a and into balancing engagement with the balancing plug 54a and the seals 57a. The cross sectional area engaged by the pressurized air at the upper end of the armature bore 56a is equal to the cross sectional area of the inlet passage 43a to provide a balanced solenoid armature 33a when the armature 33a is in the de-energized position, shown in FIG. 3.

FIG. 4 shows the modified solenoid embodiment 33a of FIG. 3 in the energized position. In the energized position the solenoid armature 33a is also in a balanced condition for the same reasons as stated hereinbefore for the armature 33 of FIG. 1.

FIG. 5 is a fragmentary, elevation section view of the upper portion of another modified upper balanced solenoid armature for use in a two-way valve, as shown in FIG. 1, and showing the modified armature in a de-energized position. The parts of the embodiment of FIG. 5 which are the same as the parts of the first valve embodiment of FIGS. 1 and 2, and the second embodiment of FIGS. 3 and 4, have been marked with the same reference numerals followed by the small letter "b".

In the modified armature embodiment of FIG. 5, the inlet bore 61b is enlarged so as to house the armature return spring 53b in the same manner, as shown in the embodiment of FIGS. 3 and 4. In the embodiment of FIG. 5, the balancing plug 54b is a captured, floating plug and it is movably mounted in the plug bore 56b, and the upper end 64 thereof seats against the lower end 23b of the pole piece 21b. The armature return spring 53b functions to not only urge the armature 33b downwardly into a poppet valve closed position but also to urge the balancing plug 54b upwardly to seat it against the lower side 23b of the pole piece 21b. The lower end of the balancing plug 54b has an enlarged diameter, designated by the numeral 65, and the armature return spring 53b seats against the lower surface 63b of the enlarged lower end of the balancing plug 54b. The cross section diameter of the bore 56b is the same as the cross sectional area of the inlet bore or passage 43 of the two-way valve, shown in FIG. 1, and accordingly when the modified armature embodiment shown in FIG. 5 is employed in the valve of FIG. 1, the solenoid armature 33b would be in a balanced position in the de-energized position shown in FIG. 5, for the same reasons as stated hereinbefore under the discussion of FIG. 1.

FIG. 6 is an elevation section view of a three-way solenoid operated poppet valve with upper balancing means and it is shown in a de-energized position. The parts of the three-way valve illustrated in FIG. 6 which are the same as the parts of the two-way solenoid operated poppet valve illustrated in FIGS. 1 and 2, have been marked with the same reference numerals followed by the small letter "c". In FIG. 6, some of the solenoid parts, such as the coil and housing have been deleted, but it will be understood that the three-way valve shown in FIG. 6 would be provided with the same solenoid operative parts as the two-way valve shown in FIG. 1.

The three-way valve shown in FIG. 6 is substantially the same in structure and functional as the two-way upper balanced valve shown in FIG. 1. The only difference is that the valve illustrated in FIG. 6 is provided with an exhaust system to convert the valve into a three-way valve. As shown in FIG. 6, the fixed balancing plug 54c is provided with longitudinal exhaust passages or slots 68 which are formed in the solenoid armature guide tube 12c, and which connect the transfer chamber 38c with the upper end of the chamber 34c in the solenoid armature guide tube 12c. The exhaust slots or passages 68 are of the type shown in FIG. 2 of U.S. Pat. No. 4,598,736. The fixed balancing plug 54c is provided with a transverse bore 69 which communicates with the upper end of the chamber 34c in the solenoid armature guide tube 12c. The transverse bore 69 functions as an exhaust port and it is connected to the exterior of the valve through an axial bore 70, which is formed through the upper end of the balancing plug 54c, and a communicating axial bore 71 which extends to the exterior of the valve through the upper end of the pole piece 21c.

When the three-way valve illustrated in FIG. 6 is in the de-energized position shown in FIG. 6, it will be seen that the transfer chamber 38c is exhausted to the exterior of the valve when the armature 33c is in the de-energized position shown in FIG. 1. When the solenoid of the valve of FIG. 6 is energized, the armature 33c is moved upwardly to the position shown in FIG. 7 and the exhaust port 69 in the balancing plug 54c is closed by the following described structure. An enlarged diameter bore 72 is formed in the upper end of the armature 33c and it extends downwardly from the upper end 35c of the armature 33c. A cylindrical slide seal 73 is operatively mounted in the groove 72 and when the armature 33c is moved upwardly into the energized position shown in FIG. 7, the seal 73 slides upwardly and over the exhaust port 69 to close off the flow therethrough and permit the inlet pressure to flow from the transfer chamber 38c and out to the passage 39 and into the cylinder port 40c. A plurality of transverse bores or passages 74 are formed through the upper end of the armature 33c and their inner end terminates at the seal 73. The bores 74 permit inlet pressure to flow up through the exhaust passages or slots 68 and create a transverse sealing pressure against the peripheral surface of the seal 73 to create an efficient seal over the ends of the exhaust port 69. The exhaust port 69 and the cylindrical slide seal 73 function as an exhaust slide valve.

The three-way valve illustrated in FIG. 6 is in a balanced condition in the de-energized and energized conditions, for the same reasons as described hereinbefore for the two-way valve illustrated in FIG. 1.

FIG. 8 is a fragmentary, elevation section view of the upper end structure of a modified armature for use in the three-way solenoid operated valve with the upper balancing means illustrated in FIG. 6, and showing the modified armature in a de-energized position. The parts of the modified armature illustrated in FIG. 8 have been marked with the same reference numerals as employed in the valve embodiments of FIGS. 1 and 6, followed by the small letter "d". The armature 33d in FIG. 8 is changed from the armature 33c in FIG. 6 in that the sliding seal 73 has been replaced by a single O-ring seal 76. The transverse seal pressure passages 74 have also been deleted. When the armature 33d is in the de-energized position shown in FIG. 8, the exhaust port 69d is opened to the upper end of the chamber 34d in the armature guide tube 12d. When the armature 33d is in the energized position shown in FIG. 9, it will be seen that the exhaust port 69d is closed by the sealing action of the O-ring seals 57d and 76. The O-ring seal 76 is positioned in a spaced apart relationship with the O-ring seal 57d so that these two seals straddle the ends of the exhaust port 69d to close this port when the armature 33d is in the energized position shown in FIG. 9.

FIG. 10 is a fragmentary, elevation section view, of another modified upper balanced solenoid armature for use in a three-way valve as disclosed in FIG. 6, and showing the modified armature in a de-energized position. The parts of the armature embodiment of FIG. 10 which are the same as the parts of the armature embodiment of FIGS. 1 and 6 have been marked with the same reference numerals followed by the small letter "e". In the modified armature 33e, the bore 56e in the upper end of the armature 33e is extended downwardly to communicate with the poppet valve seal chamber 48e. The armature return spring 53e has been disposed inside of the bore 56e and has its upper end abutting a fixed balancing plug 54e, and the lower end thereof engaging the upper side of the poppet valve seal 49e to move the armature 33e downwardly, and the poppet valve seal 49e into seating engagement on the valve seat 46e when the solenoid 11e is de-energized. The mounting of the armature return spring 53e inside of the bore 56e, instead of mounting it on the exterior of the lower end of the armature 33e, as shown in FIG. 6, provides a compact armature assembly. The modified armature embodiment of FIG. 10 permits the inlet pressurized fluid to enter through the inlet passage 43e and to pass through the bore 62e, and thence through the poppet valve seal chamber 48e and into the bore 56e, and into balancing engagement with the balancing plug 54e, and the seals 57e. The cross sectional area of the plug 54e and seals 57e engaged by the pressurized air at the upper end of the armature bore 56e is equal to the cross sectional area of the inlet passage 43e to provide a balanced solenoid armature 33e when the armature 33e is in the de-energized position, shown in FIG. 10.

FIG. 11 shows the modified solenoid embodiment 33e of FIG. 10 in an energized position. In the energized position the solenoid armature 33e is also in a balanced condition for the same reasons as stated hereinbefore for the armature 33 of FIG. 1.

Figure 12:
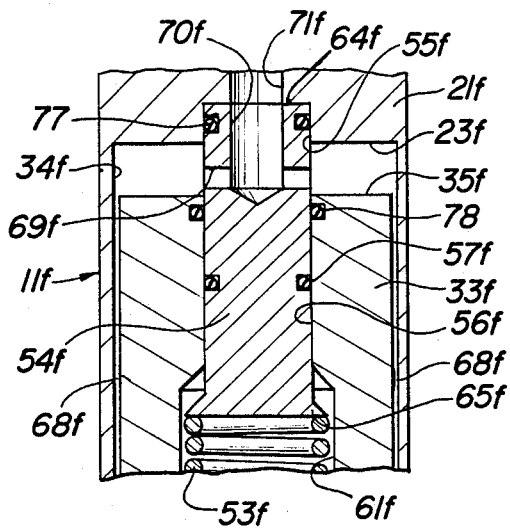
FIG. 12 is a fragmentary, elevation section view, of still another modified upper balanced solenoid armature for use in a three-way valve as disclosed in FIG. 6, and showing the modified armature in a de-energized position.
Figure 13:
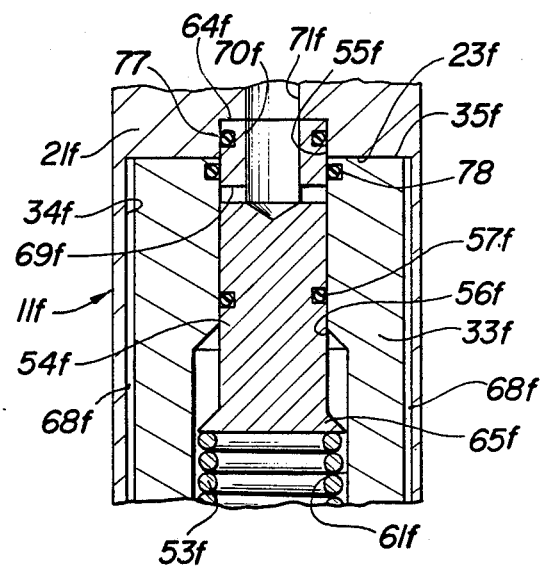
FIG. 13 is a fragmentary, elevation section view, the same as FIG. 12, but showing the modified armature of FIG. 12 in an energized position.

FIG. 12 is a fragmentary, elevation section view, of still another modified upper balanced solenoid armature for use in a three-way valve, as disclosed in FIG. 6, and showing the modified armature in a de-energized position. The parts of the modified armature shown in FIG. 12 which are the same as the parts in FIG. 6 have been marked with the same reference numerals followed by the small letter "f". In the modified armature embodiment of FIG. 12 the inlet bore 61f is enlarged so as to house the armature return spring 53f in the same manner, as shown in the embodiment of FIGS. 3 and 4. In the embodiment of FIG. 12 the balancing plug 54f is a captured, floating plug and it is releasably mounted in the plug bore 56f, and the upper end thereof is seated in the bore 55f in the lower end of the pole piece 21f. A suitable O-ring seal 77 is operatively mounted around the upper end of the balancing plug 54f in a position above the lower end 23f of the pole piece 21f. An O-ring 78 is operatively mounted around the balancing plug 54f, and it is seated in a peripheral groove formed in the armature 33f. In the de-energized position shown in FIG. 12, the exhaust port 69f is open to the upper end of the chamber 34f, so as to permit fluid to exhaust up through the exhaust slots 68f and out through the exhaust port 69f. When the armature 33f is in the energized position shown in FIG. 13, the exhaust port 69f is closed off and is straddled on the upper and lower sides thereof by the O-ring seals 78 and 57f, respectively.

Figure 14:
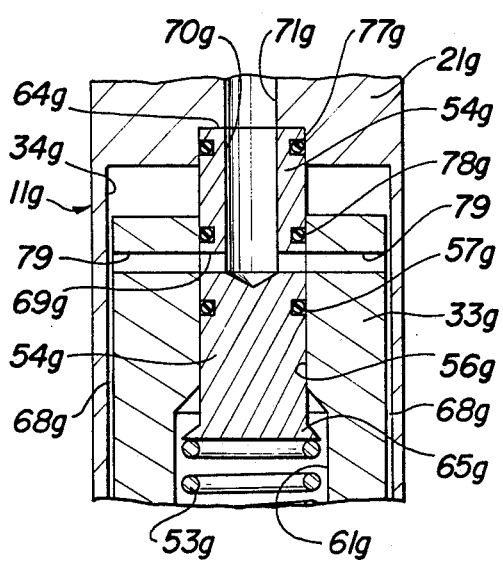
FIG. 14 is a fragmentary, elevation section view of still a further modified upper balanced solenoid armature for use in a three-way valve as disclosed in FIG. 6, and showing the modified armature in a de-energized position.
Figure 15:
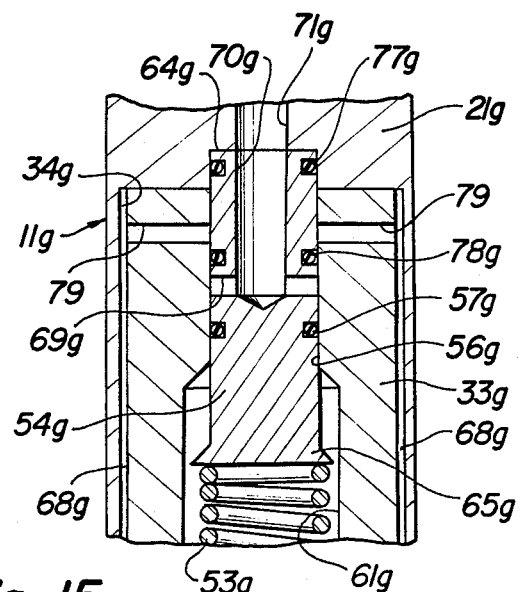
FIG. 15 is a fragmentary, elevation section view, the same as FIG. 14, but showing the modified armature of FIG. 14 in an energized position.

FIG. 14 is a fragmentary, elevation section view of still a further modified upper balanced solenoid armature for use in a three-way valve as disclosed in FIG. 6, and showing the modified armature in a de-energized position. The parts of the embodiment of FIG. 14 which are the same as the parts in two-way valve of FIG. 1, and the parts in the three-way valve of FIG. 6, and the parts of the armature embodiment of FIG. 12, have been marked with the same reference numerals followed by the small letter "g". The modified armature embodiment of FIG. 14 is substantially the same as the armature embodiment of FIG. 12 with some slight changes. In the embodiment of FIG. 14, the intermediate O-ring 78g is mounted in the balancing plug 54g instead of in the armature 33g. The exhaust bore 70g through the balancing plug 54g is extended downwardly, a further distance than that shown in the embodiment of FIG. 12. The armature 33g is provided with a plurality of transverse bores 79 which communicate the exhaust slots 68g with the exhaust port 69f when the armature 33g is in the de-energized position shown in FIG. 14. When the solenoid 33g is moved to the energized position shown in FIG. 15 the transverse exhaust bores 79 are moved to a position upwardly above the exhaust port 69f, so as to close off communicating with the exhaust port 69f.

Figure 16:
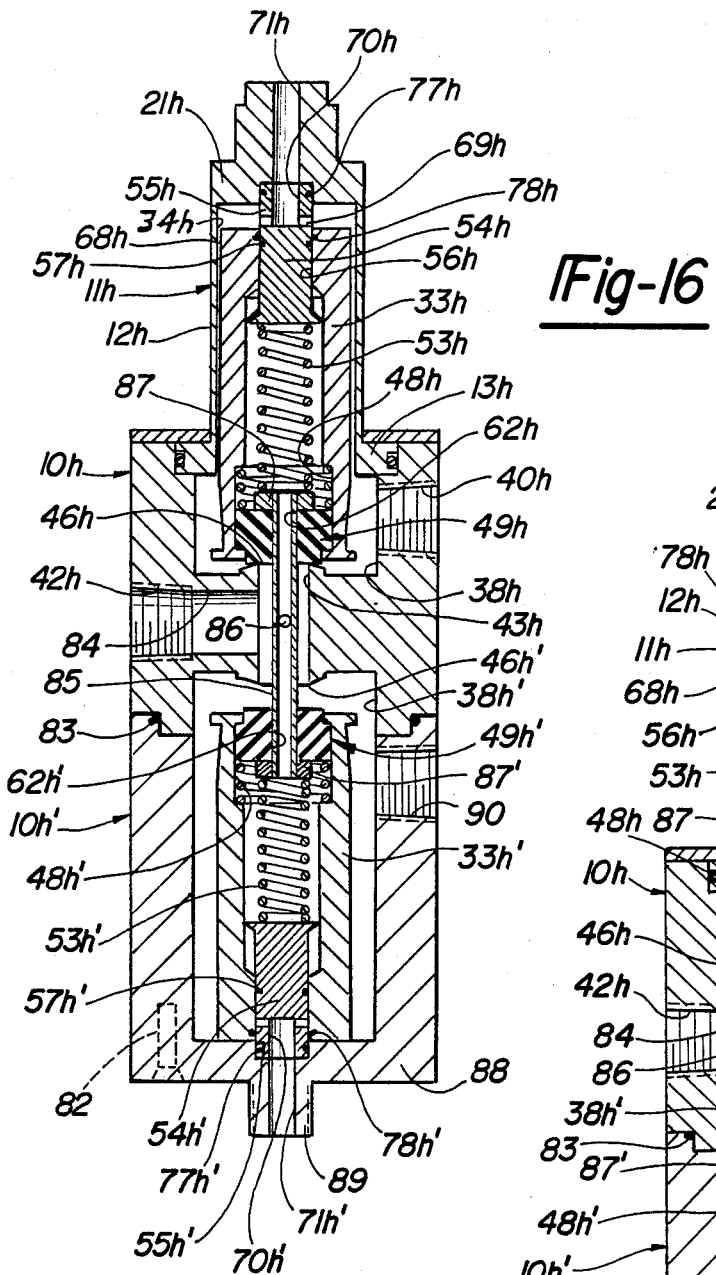
FIG. 16 is an elevation section view, with parts removed, of a four-way solenoid operated poppet valve with upper balancing means, made in accordance with the present invention, and showing the valve in a de-energized position.

FIG. 16 is an elevation section view, with parts removed, of a five-ported, four-way solenoid operated poppet valve with upper balancing means. The parts of the four-way valve illustrated in FIG. 16 which are the same as the parts of the two-way valve shown in FIG. 1 and the three-way valve shown in FIGS. 6, 12 and 13, have been marked with the same reference numerals followed by the small letter "h".

The four-way valve shown in FIG. 16 includes a valve body having an upper body portion 10h and a lower body portion 10h' which are releasably secured together by a plurality of suitable screws 82. A suitable O-ring seal 83 is mounted between the adjacent ends of the upper body portion 10h and the lower body portion 10h'. The upper body portion 10h is provided with an inlet pressure port 42h on the left side thereof, as viewed in FIG. 16. The inlet port 42h communicates through an inlet passage 84 with an axially disposed inlet bore or passage 43h. A first circular poppet valve seat 46h is formed around the upper end of the inlet bore 43h and a second circular poppet valve seat 46h' is formed at the lower end of the inlet passage 43h. The upper end of the inlet passage 43h communicates with the supply chamber 38h which in turn communicates with a normally closed cylinder port 40h. In the de-energized position shown in FIG. 16, the armature 33h is seated on the upper valve set 46h so as to block the flow of pressure fluid from the inlet passage 43h into the transfer chamber 38h. However, the normally closed cylinder port 40h is open to the exhaust passage 71h through the exhaust slots 68h, the exhaust port 69h, and the exhaust bore 70h.

A second transfer chamber 38h' is formed in the body upper and lower portions 10h and 10h', and it communicates at its upper end with the lower end of the inlet passage 43h. A non-magnetic armature 33h' is operatively mounted in the lower transfer chamber 38h and it is constructed identically to the upper magnetic armature 33h. The non-magnetic armature 33h' functions as a poppet valve member and could be constructed with a different shape than that shown in FIG. 16. However, the employment of identical armature structures for the non-magnetic armature 33h' provides an economic advantage in the manufacture of the four-way valve, shown in FIG. 16.

As shown in FIG. 16, the upper magnetic armature 33h and the lower non-magnetic armature 33h' are interconnected by a tie rod tube 85. The tie rod tube 85 is disposed axially in the inlet passage 43h and the upper end thereof is slidably mounted through the bore 62h in the poppet valve seal 49h and into the bore 48h. A suitable tie rod tube adjust nut 87 is threadably mounted on the upper end of the tie rod tube 85. The lower end of the tie rod tube 85 extends downwardly into the lower transfer chamber 38h' and is slidably extended through the bore 62h' in the poppet valve seal 49h' and into the bore 48h'. A tie rod adjust nut 87' is threadably mounted on the lower end of the tie rod tube 85. The tie rod tube adjust nuts 87 and 87' are seated against the adjacent poppet valve seals 49h and 49h', respectively. The tie rod tube 85 is provided with a plurality of inlet ports 86 which are formed circumferentially around the tie rod tube 85 to admit inlet fluid under pressure from the inlet passage 43h and up through the tie rod tube 85 and downwardly through the tie rod tube 85 for balancing engagement with the balancing plugs 54h and 54h', respectively.

The four-way valve shown in FIG. 16 is in the deenergized position, and the armature 33h is seated with the poppet valve seal 49h on the poppet valve seat 46h, so as to close off the supply of fluid under pressure to the normally closed cylinder port 40h. The lower armature 33h is in a position spaced apart from the valve seat 46h' so as to permit fluid under pressure to pass from the inlet passage 43h and down into the lower transfer chamber 38h' and out through the normally open cylinder port 90, which is formed through the side wall of the valve body lower portion 10h'.

As shown in FIG. 16, the outer end of the lower balancing plug 54h' is seated in a bore 55h' which is formed in an axial position in the lower end wall 88 of the valve body lower portion 10h'. The exhust passageway 70h' in the balancing plug 54h' communicates with the exhaust passage or bore 71h' formed in a boss 89 that is integrally formed on the outer side of the lower end wall 88 of the lower valve body portion 10h'.

Figure 17:
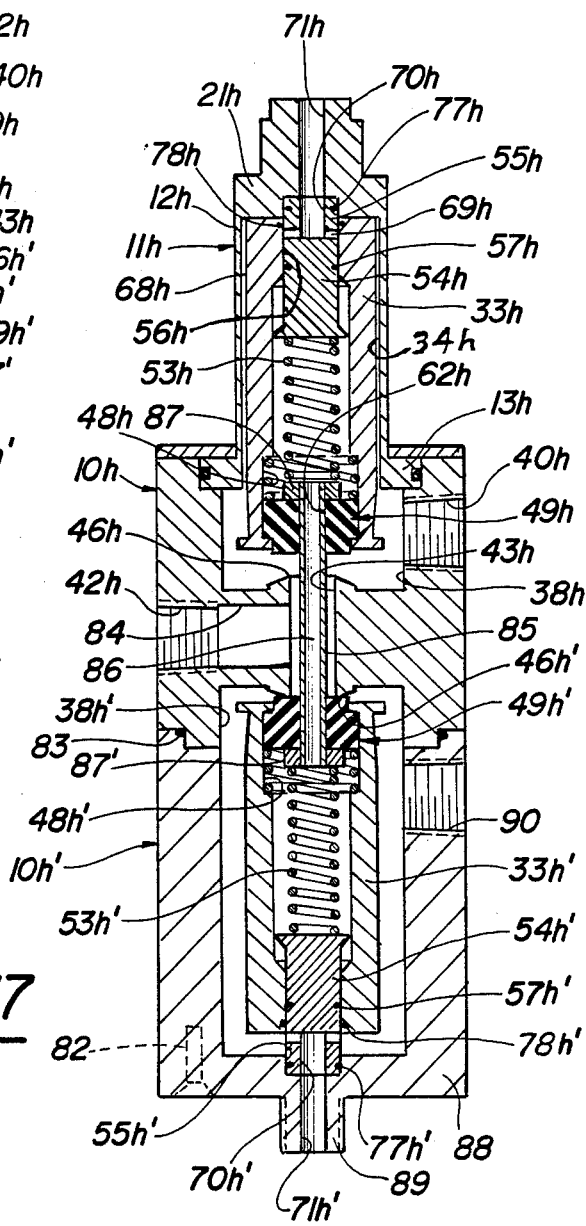
FIG. 17 is a fragmentary, elevation section view, similar to FIG. 16, of the four-way illustrated in FIG. 16, and showing the four-way valve in an energized position.

It will be seen that when the four-way valve of FIG. 16 is in the de-energized position shown therein that inlet fluid pressure is allowed to pass from the inlet port 42h and through the valve and out the normally open cylinder port 90, while at the same time the normally closed cylinder port 40h is exhausted of fluid out through the upper exhaust passage 71h. When the four-way valve shown in FIG. 16 is energized the upper magnetized armature 33h is moved upwardly to the position shown in FIG. 17, and the lower nonmagnetic armature 33h' is moved upwardly to the position shown in FIG. 17. In the energized condition of the four-way valve shown in FIG. 17, the flow of fluid through the valve is reversed, whereby the inlet pressure from the inlet port 42h is permitted to flow into the upper transfer chamber 38h and out through the normally closed cylinder port 40h. Simultaneously, the normally opened cylinder port 90 is permitted to exhaust downwardly and out through the lower exhaust passage 71h'. It will be seen that the four-way valve illustrated in FIGS. 16 and 17 provides a valve of this type which is balanced in the de-energized position, as well as in the energized position for the same reasons as explained hereinbefore for the valves shown in FIGS. 1 and 6.

Figure 18:
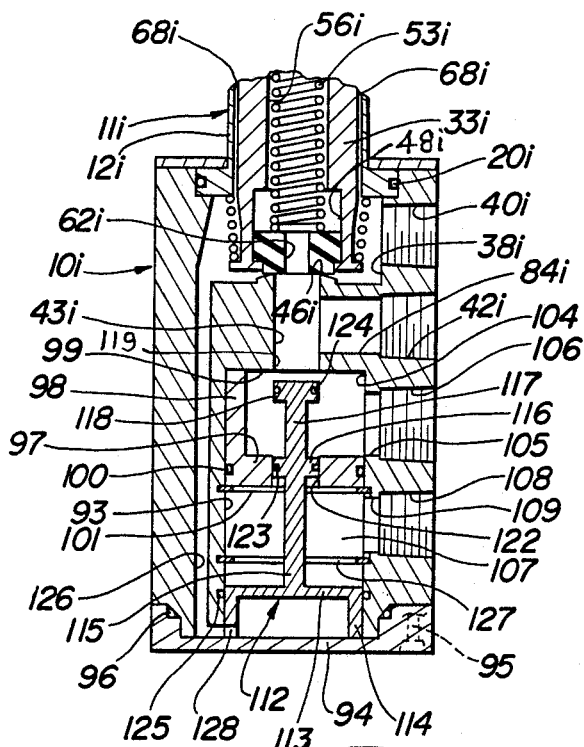
FIG. 18 is a fragmentary, elevation section view, with parts removed, of another four-way solenoid operated poppet valve with upper balancing means, made in accordance with the present invention, and showing the valve in a de-energized position.

FIG. 18 is a fragmentary, elevation view with parts removed, of another five-ported, four-way solenoid operated valve with upper balancing means and showing the valve in a de-energized position. The parts of the four-way valve illustrated in FIG. 18 which are the same as the parts of the four-way valve illustrated in FIG. 16, have been marked with the same reference numerals followed by the small letter "i".

The four-way valve shown in FIG. 18 includes a valve body 10i which has an open bottom end that is enclosed by a bottom end cap 94. The bottom end cap 94 is releasably secured to the lower end of the valve body 10i by any suitable means, as by a plurality of screws 95. A suitable O-ring seal 96 is operatively mounted between the bottom cap 94 and the lower end of the valve body 10i. An inlet pressure port 42i is formed in the valve body 10i, on the right side thereof, as viewed in FIG. 18. The inlet port 42i communicates through a inlet passage 84i with an axially disposed inlet bore or passage 43i. A first circular poppet valve seat 46i is formed around the upper end of the inlet passage 43i and a spool valve seat 119 is formed at the lower end of the inlet passage 43i. The upper end of the inlet passage 43i communicates with a supply chamber 38i which in turn communicates with a normally closed cylinder 40i port. In the de-energized position shown in FIG. 18, the armature 33i is seated on the upper valve seat 46i so as to block the flow of pressure fluid from the inlet passage 43i into the transfer chamber 38i. However, the normally closed cylinder port 40i is open to exhaust through the exhaust slots 68i which then convey the fluid through the exhaust system shown and described for the upper end structure of the four-way valve shown in FIG. 16.

The valve body 10i has formed therein an axial bore 93 which extends upwardly from the lower end thereof, and which terminates in an upper end wall designated by the numeral 99. A circular dividing wall 97 is slidably mounted in the body bore 93 and it is spaced apart from the upper end wall 99 of the bore 93 by a longitudinally extended integral spacer leg 98. A suitable O-ring seal 100 is operatively mounted in a groove formed around the outer periphery of the dividing wall 97. A snap ring 101 is operatively mounted in a groove in the wall of the bore 93 for retaining the dividing wall 97 in the operative position shown in FIG. 18. The dividing wall 97 coacts with the upper end wall 99 of the bore 93 to form a second transfer chamber 104. The transfer chamber 104 communicates through a passage 105 with a normally open cylinder port 106. A third transfer chamber 107 is formed in the valve body bore 93 in a position below the second transfer chamber 104 and it communicates through a exhaust passage 109 with an exhaust port 108.

As shown in FIG. 18, a vertically disposed, four-way spool valve, generally indicated by the numeral 112, is slidably mounted in the valve body 10i for controlling the flow of fluid between the inlet port 42i, the normally open cylinder port 106 and the exhaust port 108. The four-way spool valve 112 includes a lower end transverse circular plate 113, which functions as a piston, and which has an integral cylindrical flange 114 attached to the outer periphery thereof. The flange 114 extends downward and seats on the inner face of the valve body bottom end cap 94, when the valve is in the de-energized position as shown in FIG. 18. An axial, longitudinally extended cylindrical shaft 115 has the lower end integrally attached to the spool valve plate 113 and the upper end thereof integrally attached to a first slide valve element 116. A second cylindrical shaft 117 is axially disposed and longitudinally extended, and has its lower end integrally attached to the upper side of the first slide valve element 116, and the upper end thereof integrally attached to a second slide valve element 118.

In the de-energized position of the valve shown in FIG. 18, the first slide valve element 116 is slidably mounted in a circular bore or valve seat 122 which is axially formed through the dividing wall 97. A suitable O-ring seal 123 is operatively mounted in a groove formed around the periphery of the first slide valve element 116. A similar O-ring seal 124 is operatively mounted in a groove formed in the outer periphery of the second slide valve element 118. A suitable O-ring seal 125 is operatively mounted in a groove formed in the wall of the valve body bore 93, and it sealingly engages the outer periphery of the valve spool cylindrical flange 114.

It will be seen that when the four-way valve of FIG. 18 is in the de-energized position that the normally closed cylinder port 40i is connected to exhaust through the exhaust slots 68i, and it is closed to inlet pressure from the inlet port 42i. Simultaneously, the inlet pressure from the inlet port 42i is allowed to pass inwardly and through the passage 84i into the axial bore passage 43i, and thence downwardly through the open valve seat 119 and into the second transfer chamber 104 and out through the passage 105 and through the normally open cylinder port 106. The exhaust port 108 is blocked from communication with the normally open cylinder port 106 by the first slide valve element 116 which is seated in the circular valve seat or valve bore 122.

Figure 19:
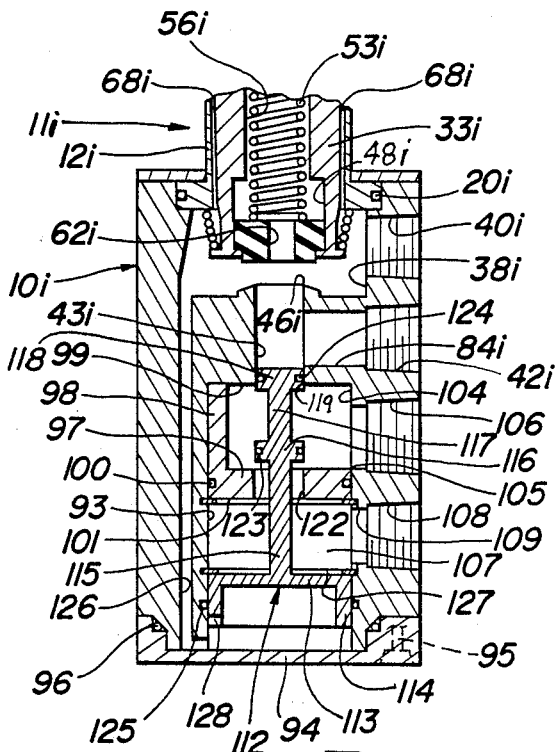
FIG. 19 is a fragmentary, elevation section view, similar to FIG. 18, of the four-way valve illustrated in FIG. 18, and showing the four-way valve in an energized position.

When the four-way valve of FIG. 18 is moved to the energized position shown in FIG. 19, the aforedescribed flow of fluid between the various ports is reversed in the following manner. The normally closed cylinder port 40i cannot exhaust through the exhaust slots 68i and it is open through the first or upper transfer chamber 38i and the axial passage 43i with the inlet port 42i through the passage 84i. The inlet pressure entering the inlet port 42i passes into the passage 84i and into the axial passage 43i and into the transfer chamber 38i from where it is conveyed to the longitudinally extended pressure passage 126 formed in the left side of the valve body 10i, as viewed in FIGS. 18 and 19. The inlet pressure passes down the passage 126 and through a passage 128 in the flange 114 and into the bore 93 under the four-way spool valve 112 and lifts the vertical, four-way spool valve 112 upwardly to the position shown in FIG. 19. The upward movement of the four-way spool valve 112 is limited by a second snap ring 127 which is operatively mounted in a suitable groove formed in the wall of the valve body bore 93. It will be seen that the upward movement of the four-way spool valve 112 shifts the first slide valve element 116 out of the valve seat or valve bore 122 to allow flow of fluid therethrough and slides the second slide valve element 118 upwardly into closing engagement with the valve seat 119. When the four-way spool valve 112 is in the position shown in FIG. 19 the normally open cylinder port 106 is connected to the exhaust port 108 through the passage 105, the second transfer chamber 104, the valve seat bore 122, the third transfer chamber 107, and an exhaust passage 109. Inlet pressure also operates on the upper end of the valve element 118 of the four-way valve spool 112, but the lower end plate 113 has a larger area, and the differential pressure areas between the valve element 118 and the plate 113 causes the inlet pressure to raise the four-way valve spool 112 to the raised position shown in FIG. 19, when the valve of FIGS. 18 and 19 is energized. When the valve of FIGS. 18 and 19 is de-energized the inlet pressure is blocked from the passage 126, and the pressure in passage 126 is exhausted through the transfer chamber 38i and the exhaust slots 68i. The inlet pressure acts against the valve element 118 to return the four-way spool valve 112 back to its lowered position in FIG. 18. The armature 33i in the four-way valve embodiment of FIGS. 18 and 19 is in a balanced condition in the de-energized and energized positions for the same reasons as explained hereinbefore under the discussion of the valves shown in FIGS. 1 and 6.

Figure 20:
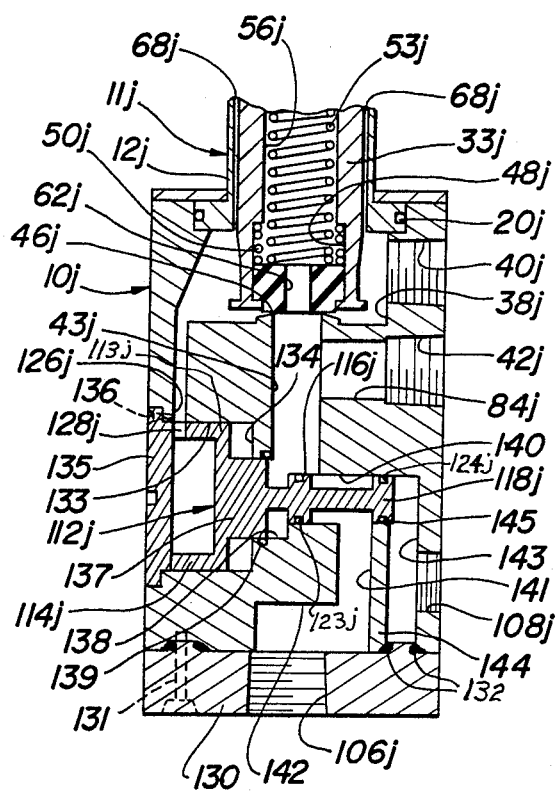
FIG. 20 is an elevation section view, with parts removed, of a further four-way solenoid operated poppet valve with upper balancing means, made in accordance with the present invention, and showing the valve in a de-energized position.

FIG. 20 is an elevation, section view with parts removed, of a further four-way solenoid operated valve with upper balancing means and showing the valve in a de-energized position. The parts of the four-way valve illustrated in FIG. 20 which are the same as the parts of the four-way valve illustrated in FIGS. 18 and 19, have been marked with the same reference numerals followed by the small letter "j".

The four-way valve shown in FIG. 20 includes a valve body 10j which has the lower end thereof enclosed by a bottom end cap 130. The end cap 130 is releasably secured to the lower end of the valve body 10j by any suitable means, as by a plurality of screws 131. A pair of suitable O-ring seals 132 are operatively mounted between the lower end of the valve body 10j and the upper side of the bottom cap 130. An inlet pressure port 42j is formed in the valve body 10j on the right side thereof, as viewed in FIG. 20. The inlet port 42j communicates through an inlet passage 84j with an axially disposed inlet bore or passage 43j. A circular poppet valve seat 46j is formed around the upper end of the inlet bore 43j. The upper end of the inlet passage 43j communicates with a supply chamber 38j which in turn communicates with a normally closed cylinder port 40j. In the de-energized position shown in FIG. 20, the armature 33j is seated on the upper valve seat 46j so as to block the flow of pressure fluid from the inlet passage 43j into the transfer chamber 38j. However, the normally closed cylinder port 40j is open to exhaust through the exhaust slots 68j which then convey the fluid through the exhausting system shown and described for the upper end structure for the four-way valve, which is shown in FIG. 16.

The valve body 10j has formed in the left side thereof, as viewed in FIG. 20, a transverse cylindrical bore 133 which extends inwardly and which terminates at an inner end wall designated by the numeral 134. The outer end of the transverse bore 133 is enclosed by a side wall cap 135 which is fixed in place by any suitable means, as by a plurality of screws 136. A horizontally disposed four-way spool valve, generally indicated by the numeral 112j is slidably mounted in the bore 133, and it is constructed substantially the same as the four-way spool valve 112 employed in the valve embodiment of FIGS. 18 and 19. The only difference between the four-way spool valve 112 of FIGS. 18 and 19, and the four-way spool valve 112j is that the shaft 115 of the first mentioned four-way spool valve has been enlarged in the four-way spool valve 112j so as to provide an enlarged shaft portion 137 which is integral with the transverse circular plate 113j and which is slidably extended into a bore 138 that communicates with the inner end of the cylindrical bore 133. A suitable O-ring seal 139 is operatively mounted in a groove in the valve body 10j in a position around the bore 138 and it slidably engages the outer periphery of the enlarged diameter shaft portion 137.

The four-way spool valve 122j includes a first slide valve element 116j which is slidably mounted in a transverse bore 140 which communicates with the bore 138 at one end thereof, and which communicates along the inner end thereof with the lower end of the inlet passage 43j. The lower side of the bore 140 communicates with the upper end of a longitudinal passage 141, and the lower end of the passage 141 communicates with a transverse passage 142, which in turn communicates with a normally open cylinder port 106j that is formed through the bottom end cap 130. The outer end of the transverse bore 140 communicates with the upper end of a longitudinally extended passage 143, which communicates with an exhaust port 108j. The vertical passages 141 and 143 are separated by longitudinally extended dividing wall 144. The portion of the transverse bore 140 that extends through the dividing wall 144 forms a valve seat 145 for the second slide valve element 118j.

It will be seen that the four-way valve of FIG. 20 is in a de-energized position, and that the normally closed cylinder port 40j is connected to exhaust through the exhaust slots 68j, and that it is closed to inlet pressure from the inlet port 42j. Simultaneously, the inlet pressure from the inlet port 42j is allowed to pass inwardly and through the passage 84j into the axial inlet passage 43j, and thence downwardly through the inner end of the transverse bore 140 and out through the passage 141 and 142, and through the normally open cylinder port 106j. The exhaust port 108j is blocked from communication with the normally open cylinder port 106j by the second slide valve element 118j which is seated in the circular valve seat 145.

Figure 21:
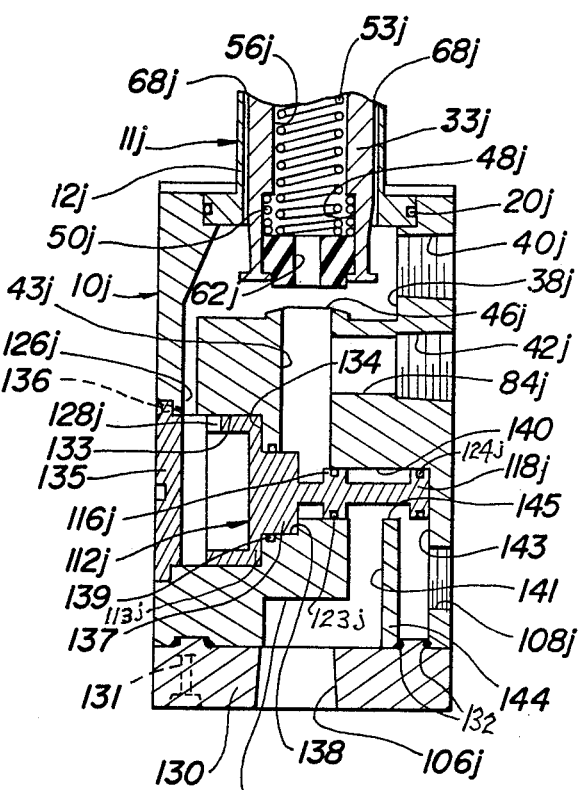
FIG. 21 is an elevation section view, similar to FIG. 20, of the four-way valve illustrated in FIG. 20, and showing the four-way valve in an energized position.

When the four-way valve of FIG. 20 is moved to the energized position shown in FIG. 21, the aforedescribed flow of fluid between the various ports is reversed in the following manner. The normally closed cylinder port 40j cannot exhaust through the exhaust slots 68j and it is open through the transfer chamber 38j and the axial inlet passage 43j with the inlet port 42j through the passage 84j. The inlet pressure entering the inlet port 42j passes into the inlet passage 84j and into the axial passage 43j, and thence into the transfer chamber 38j where it is also conveyed to the longitudinally extended pressure passage 126j formed in the left side of the valve body 10j, as viewed in FIGS. 20 and 21. The inlet pressure passes down and through a passage 128j in the flange 114j and into the transverse bore 133 and against the four-way spool valve 112j and shifts the four-way spool valve 112j transversely or horizontally to the position shown in FIG. 21. The sideward movement to the right, as viewed in FIG. 21, is limited by the inner end of the four-way spool valve shaft 137 hitting against the inner end 134 of the transverse bore 133. It will be seen that the sideward, horizontal movement of the four-way spool valve 112j shifts the first slide valve element 116j into the inner end of the transverse bore 140 and the second slide valve element 118j out of the valve seat 145. When the four-way spool valve 112j is in the position shown in FIG. 21, the normally open cylinder port 106j is connected to the exhaust port 108j through the passages 142, 141, the valve seat bore 145 and the passage 143. The normally closed cylinder port 40j is closed to exhaust through the exhaust slots 68j but it is opened through the transfer chamber 38j, the inlet passage 43j and the passage 84j to the inlet port 42j.

The armature 33j in the four-way valve embodiment of FIGS. 20 and 21 is in a balanced condition in the deenergized and energized positions for the same reasons as explained hereinbefore under the discussion of the valve shown in FIGS. 1 and 6. When the solenoid 11j is deenergized, the armature 33j moves downwardly to the position shown in FIG. 20 to again close off the flow of inlet pressure from the inlet port 42j and through the passage 84j and the passage 43j into the transfer chamber 38j, and the inlet pressure is diverted downwardly in the passage 43j and reacts against the inner end or right end of the four-way spool valve shaft 137 to move the four-way spool valve 112j to the left and back to the de-energized position shown in FIG. 20.

What is claimed is:

1. A balanced solenoid operated valve characterized in that it comprises:
   (a) a valve body, having a transfer chamber formed in one end thereof and extending longitudinally inward from said one end of the valve body, and having an axial hole formed therein which communicates with and extends inward in the valve body from the transfer chamber;
   (b) a solenoid operatively mounted on said one end of said valve body, and having an armature guide tube which is enclosed at the upper end thereof by a solenoid pole piece and open at the lower end thereof, and having an armature with an upper end and a lower end, and being movable axially in said guide tube between a balanced de-energized position and a balanced energized position, and said armature being disposed with said lower end extending out of the open lower end of the guide tube and into the transfer chamber in the valve body;
   (c) said axial hole in the valve body having a poppet valve seat formed therearound at the end thereof which communicates with said transfer chamber;
   (d) said armature having a poppet valve seal mounted in the lower end thereof;
   (e) means for normally biasing said armature in a direction outward of the open end of the guide tube when the solenoid is de-energized to move the poppet valve seal on the lower end of the armature into seating engagement with said poppet valve seat formed around said axial hole;
   (f) a pressurized fluid inlet port formed in said valve body which communicates with said axial hole;
   (g) a transfer port formed in said valve body which communicates with said transfer chamber, and which communicates with the inlet port when the armature is energized, and which is blocked from communication with the inlet port when the armature is de-energized;
   (h) an axial balancing hole formed in the upper end of the armature, and having the upper end thereof open to the guide tube, and being formed to a cross section area equal to the cross section area of the axial hole in the valve body;
   (i) a sealed balancing plug means operatively mounted in said balancing hole in the armature; and,
   (j) fluid passage means formed through the armature and poppet valve seal and interconnecting the axial hole in the valve body with the axial balancing hole in the armature to convey pressurized fluid from the inlet port into the axial balancing hole in the upper end of the armature and into balancing engagement with the balancing plug means to balance the armature when it is in a de-energized position.

2. A balanced solenoid operated valve as defined in claim 1, characterized in that:
   (a) said sealed balancing plug means comprises an elongated plug having an inner end, and an outer end which is extended out of said axial balancing hole in the armature and into a fixed seating engagement in a hole in the pole piece.

3. A balanced solenoid operated valves as defined in claim 1, characterized in that:
   (a) the means for normally biasing the armature to seat the poppet valve seal on the poppet valve seat comprises a spring means mounted in the fluid passage means in the armature, and having one end thereof seated against the balancing plug means, and the other end thereof seated against the poppet valve seat in the armature.

4. A balanced solenoid operated valve as defined in claim 3, characterized in that:
   (a) said sealed balancing plug means comprises an elongated plug movably mounted in the axial balancing hole in the armature, and having an outer end which extends out of said axial balancing hole and seats against the pole piece, and an inner end which has an enlarged periphery against which is seated said one end of the spring means.

5. A balanced solenoid operated valve as defined in claim 2, characterized in that:
   (a) said armature guide tube is provided with longitudinal exhaust slots, which have lower ends that are in communication with said transfer chamber, and which have upper ends that are in communication with the interior of the upper closed end of the armature guide tube;
   (b) said balancing plug is provided with a transverse exhaust port which has a pair of ends that communicate with the upper interior end of the armature guide tube when the armature is in the de-energized position; and,
   (c) exhaust passage means formed through the outer end of the balancing plug and the pole piece to communicate the exhaust port in the balancing plug with the exterior of the valve, whereby when the armature is in the de-energized position the transfer chamber is open to the exterior of the valve through the exhaust passage means in the pole piece, and by communication through said guide tube exhaust slots and said transverse exhaust port in the balancing plug, and when the armature is in an energized position the armature is moved to a position enclosing the ends of the transverse exhaust port in the balancing plug to block the exhaust port and open communication between the inlet port and the transfer port, and seal means are disposed between the armature and balancing plug to seal the ends of the exhaust port.

6. A balanced solenoid operated valve as defined in claim 5, characterized in that:
   (a) said seal means disposed between the armature and the balancing plug comprises a slide seal means carried on the armature at the upper end thereof in a position around the axial balancing hole.

7. A balanced solenoid operated valve as defined in claim 6, characterized in that:
   (a) said slide seal means is a tubular seal which is slidable over the ends of the transverse exhaust port.

8. A balanced solenoid operated valve as defined in claim 6, characterized in that:
   (a) said slide seal means comprises a pair of longitudinally spaced apart O-ring seals which slide over the open ends of the transverse exhaust port and are in a port closing position disposed on opposite sides of the port ends.

9. A balanced solenoid operated valve as defined in claim 6, characterized in that:
   (a) the means for normally biasing the armature to seat the poppet valve seal on the poppet valve seat comprises a spring means mounted in the fluid passage means in the armature, and which has one end thereof seated against the balancing plug, and the other seated against the poppet valve seal in the armature.

10. A balanced solenoid operated valve as defined in claim 5, characterized in that:
    (a) the seal means disposed between the armature and the balancing plug comprises, a first O-ring carried on the armature at the upper end thereof in a position around the axial balancing hole, and a second O-ring carried around the balancing plug in a position spaced longitudinally from said first O-ring on the armature.

11. A balanced solenoid operated valve as defined in claim 10, characterized in that:
    (a) the means for normally biasing the armature to seat the poppet valve seal on the poppet valve seat comprises a spring means mounted in the fluid passage means in the armature, and having one end thereof seated against the enlarged inner end of the balancing plug, and the other end thereof seated against the poppet valve seal in the armature.

12. A balanced solenoid operated valve as defined in claim 10, characterized in that:
    (a) the seal means disposed between the armature and the balancing plug comprises a plurality of O-rings carried on the balancing plug; and,
    (b) the balancing plug is provided with a transverse passage to communicate the exhaust port with the interior of the armature guide tube when the armature is in the de-energized position.

13. A balanced solenoid operated valve as defined in claim 10, characterized in that:
    (a) the means for normally biasing the armature to seat the poppet valve seal on the poppet valve seat comprises a spring means mounted in the fluid passage means in the armature, and which has one end thereof seated against the enlarged inner end of the balancing plug, and the other end thereof seated against the poppet valve seal in the armature.

14. A balanced solenoid operated valve as defined in claim 5, characterized in that:
    (a) said valve body has a second transfer chamber formed in the other end of the valve body and it communicates with the axial hole in the valve body;
    (b) a second transfer port is formed in said valve body and it communicates with said second transfer chamber;
    (c) said axial bore in the valve body has a second poppet valve seat formed at the end thereof which communicates with the second transfer chamber;
    (d) a second exhaust port is operatively mounted in said second transfer chamber and it communicates to the exterior of the valve through exhaust passages formed in the valve body;
    (e) a valve member is movably mounted in said second transfer chamber, and which is a second poppet valve seal on one end thereof for selective seating engagement with said second poppet valve seat, and which is provided with an exhaust valve closure means for engagement with said second exhaust port for selective closing of the second exhaust port; and,
    (f) a coupling means interconnects the armature with said valve member in the second transfer chamber, and it is adapted to hold the valve member in an initial position, when the armature is in a de-energized position, wherein the second poppet valve seal is unseated from the second poppet valve seat and said exhaust valve closure means is in a closed position on the second exhaust port to allow pressurized fluid to flow from the inlet port and through the axial hole in the valve body and into the second transfer chamber and thence out of the valve body through the second transfer port, and said coupling means is further adapted to move the valve member, when the armature is energized, to a second position to move the second poppet valve seal so it is seated on the second poppet valve seat and the said exhaust closure means is in an open position to allow fluid flow through the second exhaust port, and to block flow of pressurized fluid into the second transfer chamber and communicate the second transfer port with the second exhaust port through the second transfer chamber.

15. A balanced solenoid operated valve as defined in claim 14, characterized in that:
    (a) said coupling means includes a tie rod tube which is movably mounted through the axial hole in the valve body and through the fluid passage means through the first named poppet valve seal and an axial hole through said second poppet valve seal, and said coupling means further includes means to releasably secure the tie rod tube to the armature and said valve member, and fluid passage means is provided through the tie rod tube to connect the axial hole in the valve body with the fluid passage means in the armature.

16. A balanced solenoid operated valve as defined in claim 5, characterized in that:
    (a) said valve body has a second transfer chamber formed therein which communicates with said axial hole in the valve body at an end of the axial hole which is opposite to the end of the axial hole that communicates with the first named transfer port;
    (b) a second transfer port is formed in said valve body and it communicates with said second transfer chamber;
    (c) a third transfer chamber is formed in the valve body, in the end thereof opposite to said one end of the valve body, and it is separated from the second transfer chamber by a dividing wall through which is formed a first slide valve seat;
    (d) said axial hole in the valve body has a second slide valve seat formed therein at the end thereof which communicates with the second transfer chamber and which is axially aligned with said first named slide valve seat in said axial hole in said valve body;
    (e) a movable spool valve is operatively mounted in said second and third chambers and incldes a fluid pressure piston, which encloses the end of the third transfer chamber opposite to said dividing wall, and said spool valve further includes shaft means that carries two axially spaced apart first and second slide valve elements for alternate seating in said first and second slide valve seats;

(f) an exhaust port is formed in the valve body and it communicates with the third transfer chamber; and, (g) the valve body includes fluid passage means interconnecting the first transfer chamber with the underside of said pressure piston of said spool valve, whereby when the armature is in the de-energized position said spool valve is in a first position with said first slide valve element seated in the slide valve seat in said dividing wall and the second slide valve element is in an open position spaced apart from the slide valve seat in said axial hole in the valve body, to allow pressurized fluid to flow from the inlet port and into said axial hole in the valve body and into the second transfer chamber and out of the second cylinder port, and simultaneously the pressurized fluid in the second transfer chamber exerts an axial force in one direction on the spool valve to maintain the spool valve in said first position, and when the armature is energized, pressurized fluid is conducted from the inlet port and through the axial hole in the valve body and through said fluid passage means in the valve body to the underside of the spool valve pressure piston to move the spool valve in the other direction into a second position, with the second slide valve element in a seating position in the second slide valve seat in the axial hole in the valve body, and with the first slide valve element moved up into the second transfer chamber to open a passage through the first slide valve seat in said dividing wall and communicate the second cylinder port with the last named exhaust port through the second transfer chamber, the first slide valve seat formed through the dividing wall and the third transfer chamber, and when the armature is de-energized the pressure in the fluid passage means in the valve body is exhausted to the first named exhaust port, and pressurized fluid in the second transfer chamber exerts an axial force on the second slide valve element to move the spool valve back to said first position.

17. A balanced solenoid operated valve as defined in claim 5, characterized in that:

(a) said valve body is provided with an exhaust passage which communicates with a second exhaust port;

(b) said valve body is provided with a second cylinder passage communicating with a second cylinder port;

(c) said valve body is provided with a transverse bore that communicates the axial hole in the valve body with said exhaust passage and second cylinder passage; and, (d) a differential pressure spool valve is slidably mounted in the valve body for movement between a first position and a second position, and said spool valve has a first slide valve element and a second slide valve element axially spaced apart from said first slide valve element, and said slide valve elements are adapted to be alternately seated in a pair of slide valve seats formed in said transverse bore, whereby when the armature is de-energized the slide spool valve is in said first position with the second slide valve element in one of the slide valve seats to block fluid flow to the exhaust port and to communicate said second cylinder port through the second cylinder passage and said transverse bore and to said axial hole in said valve body and thence to said inlet port, and when said armature is energized, pressurized fluid is allowed to pass from the inlet port and through the axial hole in the valve body and through a fluid passage in the valve body and under one end of the spool valve to move it to a second position to move the first slide valve element into a valve seat in said transverse bore and unseat the first valve element to block flow from the axial hole in the valve body and communicate the second cylinder port with the exhaust port through the second cylinder passage, the transverse bore and the exhaust passage, and when the armature is again de-energized, the pressurized fluid from the inlet port will flow into the axial hole in the valve body and against the other end of the spool valve and return it to said first position.

* * * * *